United States Patent
Dawirs et al.

(10) Patent No.: US 10,162,540 B2
(45) Date of Patent: Dec. 25, 2018

(54) STORAGE IN FLASH MEMORY

(71) Applicant: Proton World International N.V., Diegem (BE)

(72) Inventors: Michel Dawirs, Wezembeek-Oppem (BE); Jean-Louis Modave, Ottignies (BE); Michael Peeters, Tourinnes-la-Grosse (BE); Guillaume Docquier, Liege (BE)

(73) Assignee: PROTON WORLD INTERNATIONAL N.V., Diegem (BE)

( * ) Notice: Subject to any disclaimer, the term of this patent is extended or adjusted under 35 U.S.C. 154(b) by 47 days.

(21) Appl. No.: 15/380,509

(22) Filed: Dec. 15, 2016

(65) Prior Publication Data
US 2017/0336996 A1    Nov. 23, 2017

(30) Foreign Application Priority Data
May 20, 2016 (FR) ..................... 16 54490

(51) Int. Cl.
G06F 11/00 (2006.01)
G06F 3/06 (2006.01)
(Continued)

(52) U.S. Cl.
CPC ............ G06F 3/0619 (2013.01); G06F 3/064 (2013.01); G06F 3/0679 (2013.01);
(Continued)

(58) Field of Classification Search
None
See application file for complete search history.

(56) References Cited

U.S. PATENT DOCUMENTS

| 5,457,658 A | 10/1995 | Nijima et al. |
| 6,513,095 B1 | 1/2003 | Tomori |
| (Continued) | | |

FOREIGN PATENT DOCUMENTS

| EP | 2 058 737 A1 | 5/2009 |
| EP | 2 282 266 A1 | 2/2011 |
| WO | 2012/013683 A1 | 2/2012 |

OTHER PUBLICATIONS

French Search Report and Written Opinion, dated May 29, 2017, for French Application No. 1658442, 10 pages.
(Continued)

Primary Examiner — Daniel F. McMahon
(74) Attorney, Agent, or Firm — Seed IP Law Group LLP

(57) ABSTRACT

A flash memory is divided into pages defining an erase granularity of the flash memory. A count value is written into page metadata. Each page is divided into frames. Each frame contains at least one data block and at least two frame metadata words including a first frame metadata word to store a block identifier. A current page is opened by incrementing the count value and writing the incremented count value into the at least one first page metadata word. The current page has its at least one first page metadata word containing a highest count value of the counter of the number of written pages. A logic data block is written into a selected frame and a block identifier of the logic data block is written into the first frame metadata word of the selected frame.

21 Claims, 7 Drawing Sheets

(51) Int. Cl.
*G06F 11/10* (2006.01)
*G06F 12/02* (2006.01)

(52) U.S. Cl.
CPC ...... *G06F 11/1004* (2013.01); *G06F 12/0246* (2013.01); *G06F 2212/1036* (2013.01); *G06F 2212/7204* (2013.01); *G06F 2212/7207* (2013.01); *G06F 2212/7209* (2013.01)

(56) References Cited

U.S. PATENT DOCUMENTS

| | | | |
|---|---|---|---|
| 2007/0113120 A1 | 5/2007 | Dodge | |
| 2009/0012976 A1 | 1/2009 | Kang et al. | |
| 2009/0172259 A1* | 7/2009 | Prins | G06F 13/1657 |
| | | | 711/103 |
| 2010/0169543 A1 | 7/2010 | Edgington et al. | |
| 2011/0066790 A1* | 3/2011 | Mogul | G06F 12/023 |
| | | | 711/103 |
| 2011/0238886 A1 | 9/2011 | Post et al. | |
| 2016/0203075 A1* | 7/2016 | Shin | G11C 7/1039 |
| | | | 711/103 |

OTHER PUBLICATIONS

"IBM solidDB Version 7.0 Getting Started Guide," 1$^{st}$. ed., 5$^{th}$ revision, 2013, 94 pages.

Kim et al., "LSB-Tree: a log-structured B-Tree index structure for NAND flash SSDs," *Des Autom Embed Syst* 19:77-100, 2015.

Zeinalipour-Yazti et al., "MicroHash: An Efficient Index Structure for Flash-Based Sensor Devices," *FAST '05: 4$^{th}$ USENIX Conference on File and Storage Technologies*, 2005, pp. 31-44.

Dawirs et al., "Index Management in a Flash Memory," U.S. Appl. No. 15/444,746, filed Feb. 27, 2017, 33 pages.

French Search Report, for French Application No. 1654490, 10 pages.

* cited by examiner

STORAGE IN FLASH MEMORY

BACKGROUND

Technical Field

The present disclosure generally relates to electronic circuits and, more specifically, to circuits using a flash memory. The present disclosure more specifically aims at the management of a flash memory.

Description of the Related Art

Flash memories are increasingly used in microcontrollers to store data in non-volatile fashion.

Data storage in a flash memory has various time constraints due to the granularity of the operations performed, the writing being performed by word (for example, by word of four bytes), while the erasing is performed by page of several words (from a few tens to a few hundreds of words).

In certain applications, is it desired to ascertain that the transactions performed and stored fulfill an atomicity criterion. The atomicity of a transaction corresponds to ascertaining that data stored in a memory effectively have a processable and uncorrupted state. This amounts to ascertaining that data in the non-volatile memory have either their state before the transaction or their state after the concerned transaction, but that they do not have an intermediate state.

Transaction atomicity management is particularly used in applications where an interruption of the circuit power supply or the occurrence of an incidental or intentional disturbance may generate the storage of data in a state which makes them either impossible to subsequently process or vulnerable in terms of confidentiality. For example, in the field of microcircuit cards, it is desired to ascertain that in case of an intentional or incidental untimely pulling out of a card from the reader where it has been placed, the data contained in a flash memory of the card are reliable. In a circuit integrating a security module, the equivalent of an untimely pulling out corresponds to a powering off of the circuit.

BRIEF SUMMARY

At least one embodiment of the present disclosure improves the management of data storage in a flash memory, in particular, preserves the atomic character of certain transactions implying updating data in the flash memory.

An embodiment overcomes all or part of the disadvantages of known flash memory management techniques.

An embodiment of a first aspect eases the management of the atomicity of transactions in a flash memory.

An embodiment of a second aspect balances the erasing of the pages of a flash memory.

Thus, an embodiment of the first aspect provides a method of managing a flash memory, wherein:
the data to be stored are organized in logic blocks;
the memory is divided into pages;
each page is divided into frames, each frame being capable of containing at least one data block and at least two frame metadata words;
each page comprises at least one page metadata word which contains, when the page is written into, a value of a counter of the number of written pages;
a writing of a logic block in the memory goes along with a programming of a first frame metadata word with an identifier of this logic block; and
the page into which the writing should be performed is selected as being that having its first metadata word containing the maximum value of the counter of written pages from among all pages.

According to an embodiment, the frames are written into sequentially in a page.

According to an embodiment, the first frame metadata word also contains a value representative of an error-control code calculated at least from the data block of the frame.

According to an embodiment, on writing into a frame, a second frame metadata word is written first with a value, independent from the content of the data to be written, and which is always the same for a given frame.

According to an embodiment, said second metadata word has a fixed value for all memory frames.

According to an embodiment, said first page metadata word is written before the writing into a first frame in the page.

According to an embodiment, a reading of a logic data block comprises the steps of:
searching for the last written frame having its block identifier corresponding to that of the logic block;
verifying that the writing of data into this last frame respects an error-control code and, if this is not true, searching for the previous written frame having its block identifier corresponding to that of the logic data block until all pages have been scanned.

According to an embodiment, on each starting, a memory management circuit verifies the atomicity of the last written frame.

According to an embodiment, in case of a lack of atomicity, all the valid frames of the current page are transferred into an available page and the current page is erased.

According to an embodiment, said available page is a dedicated page.

An embodiment of this first aspect also provides a flash memory programmed according to the above method.

An embodiment of this first aspect also provides an electronic circuit comprising a flash memory.

An embodiment of the second aspect provides a method of managing a flash memory, wherein:
the memory is organized in pages; and
each page contains a metadata word intended to store a number of page erase operations.

According to an embodiment, the selection of a page to be erased to free space is carried out according to the number of erase operations applied to the different pages to uniformize the number of erase operations applied to each page.

According to an embodiment:
the data to be stored are organized in logic blocks;
the memory is divided into pages;
each page is divided into frames, each frame being capable of containing at least one data block and at least two frame metadata words;
each page comprises at least one page metadata word which contains, when the page is written into, a value of a counter of the number of written pages;
a writing of a logic block into the memory goes along with a programming of a first frame metadata word with an identifier of this logic block; and
the page into which the writing should be performed is selected as being that having its first metadata word containing the maximum value of the counter of written pages from among all pages.

An embodiment of this second aspect also provides a flash memory programmed according to the above method.

An embodiment of this second aspect also provides an electronic circuit comprising a flash memory such as hereabove.

The foregoing and other features and advantages will be discussed in detail in the following non-limiting description of specific embodiments in connection with the accompanying drawings.

DETAILED DESCRIPTION

Figure 1:
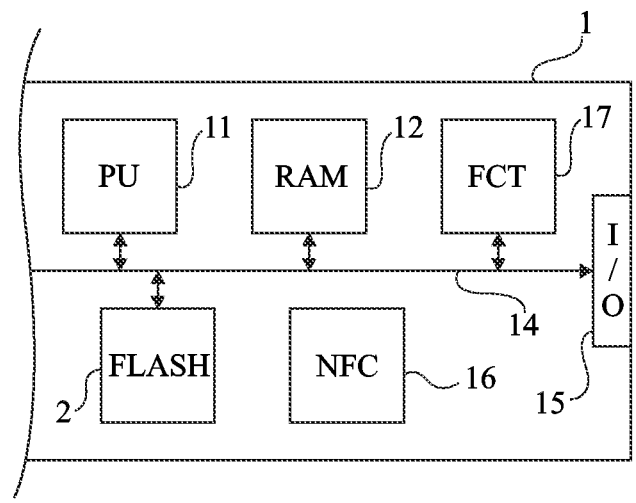
FIG. 1 very schematically shows, in the form of blocks, an embodiment of an electronic circuit of the type to which the embodiments which will be described apply as an example.

The same elements have been designated with the same reference numerals in the different drawings.

For clarity, only those steps and elements which are useful to the understanding of the embodiments which will be described have been shown and will be detailed. In particular, the electric behavior of a flash memory during write, read, and erase steps has not been detailed, the described embodiments being compatible with usual flash memory technologies. Further, the applications using an atomicity management have not been detailed either, the described embodiments being here again compatible with usual applications.

FIG. 1 very schematically shows, in the form of blocks, an embodiment of an electronic circuit 1 of the type to which the embodiments which will be described apply as an example.

Circuit 1 comprises:

a processing unit 11 (PU), for example, a state machine, a microprocessor, a programmable logic circuit, etc.;

one or more volatile storage areas 12 (RAM), for example of RAM or register type, to temporarily store information (instructions, addresses, data) during the processings;

one or more non-volatile storage areas 2, including at least one flash-type memory 2 (FLASH) for durably storing information, in particular when the circuit is not powered;

one or more data, address, and/or control buses 14 between the different elements internal to circuit 1; and an input/output interface 15 (I/O) for communication, for example, of serial bus type, with the outside of circuit 1.

Circuit 1 may also integrate a contactless communication circuit 16 (CLF—ContactLess Front-end), of near-field communication type (NFC).

Further, circuit 1 may integrate other functions, symbolized by a block 17 (FCT), according to the application, for example, a crypto-processor, other interfaces, other memories, etc.

The management of the atomicity of transactions in a circuit equipped with a flash memory is particular since the flash memory does not have the same processing granularity according to the type of operation. In particular, the writing is performed word by word (of one byte or of a few bytes) while the erasing is performed page by page. The size of a word generally corresponds to the size of a register receiving the data in series to transfer them in parallel to the memory plane for a write operation. A page is defined as being the minimum size capable of being simultaneously addressed to be erased. Typically, a page currently comprises, in a flash memory, 64, 128, 256, 512, or 1,024 bytes.

A flash memory is programmed from an initial state, arbitrarily designated as 1, to states 0 (non-conductive states of the cells). This means that the memory cells should be initialized to a high state (erasing) and that, to store a piece of data (in write mode), action is taken (programming to 0) or not (bit state at 1) on the bit states per data word.

To guarantee the atomicity of transactions, the storage in the flash memory of a piece of data should only be considered as valid once the transaction is ended and the data are said to be stable. In practice, atomicity management methods activate an indicator of the processing of data when said data are extracted from the non-volatile memory, and then organize the storage of the updated data, once the processing is over, the processing indicator then switching state. The atomicity may concern a larger or smaller quantity of data according to the nature of the transaction.

The atomicity of transactions is particularly important in the case of bank-type transactions (payment, for example) where it is necessary to ascertain that the information stored in the flash memory, for example, the balance of an electronic purse or of a purchase authorization, or the identifier validating a transaction, is reliably stored.

Generally, to guarantee the atomicity of a transaction, atomicity buffers which are updated with the initial and then with the final information are used for a transfer into the main non-volatile memory.

However, in the case of a flash memory, a difficulty is the erasing procedure, due to its page granularity, which is relatively long as compared with the word writing operation. In particular, there is a need to indicate that an erased page is stable, that is, that it has been integrally erased. Otherwise, a weakness is introduced into the data security. Further, in case a page needs to be erased with a data transfer to a new page, the transfer may result in that stable data present in the page to be erased become unstable. This more particularly occurs with large pages (for example, having a size in the order of some hundred words or more) since they are more likely to contain older data considered as stable and which should be transferred into a new page.

In contactless applications, transactions have to be carried out very rapidly due to the fleetingness of the communication, which depends on the time during which circuit 1 can communicate with a terminal. Now, managing the atomicity of transactions by using flash memory buffers takes time, due to the erase operations that authorize a programming.

According to the embodiments which will be described, the storage of data in the memory is provided to be organized in specific fashion.

Figure 2:
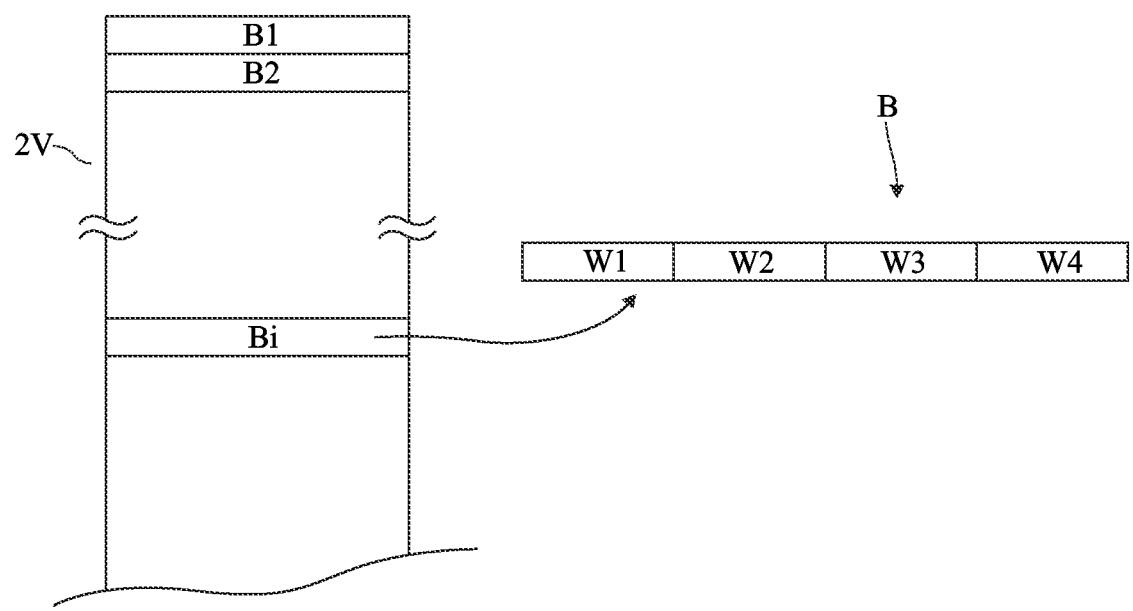
FIG. 2 illustrates an embodiment of a logic organization of data to be stored in a flash memory.

FIG. 2 illustrates an embodiment of a logic organization of data to be stored in a flash memory. In other words, this drawing illustrates the way in which the data are managed by processing unit 11 and the different entities of circuit 1 of FIG. 1 for their storage into the flash memory. Reference is made hereafter to a memory management circuit in charge of organizing its addressing, the writing, the reading, and the erasing as well as the conversion of logic addresses into physical addresses. This circuit or management unit is a circuit programmed according to the implementation of the described method and may be the processing unit.

According to this embodiment, the assembly of data representing the storage capacity of the flash memory is seen as a single array 2V of data blocks B1, B2, etc. and each block Bi contains a same number of words W. In the example shown in FIG. 2, each data block Bi is assumed to contain four words W1, W2, W3, and W4. The size of a word corresponds to the write granularity in the flash memory, that is, in practice, from one to a few bytes (for example, four). However, this is an arbitrary example and any other number of one or more bytes may form a word and any other number of one or more words may form a block. Thus, the logic division of the flash memory is not performed page by page but by block B having a size independent from the page size.

Data A to be stored into memory 2 comprise an arbitrary number of bytes, independent from the size of a block. From a logic point of view, that is, for processing unit 11, data are defined by a length L(A), that is, a number of bytes, and the position thereof in array 2V of blocks Bi is defined by an offset O(A), that is, an offset from the beginning of array 2V.

Figure 3:
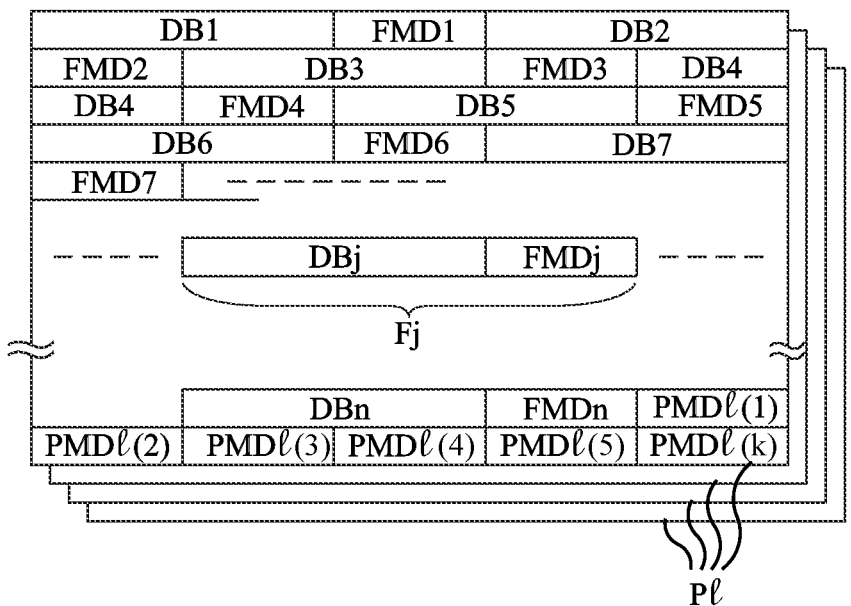
FIG. 3 illustrates an embodiment of a physical organization of data in a flash memory.
Figure 3:
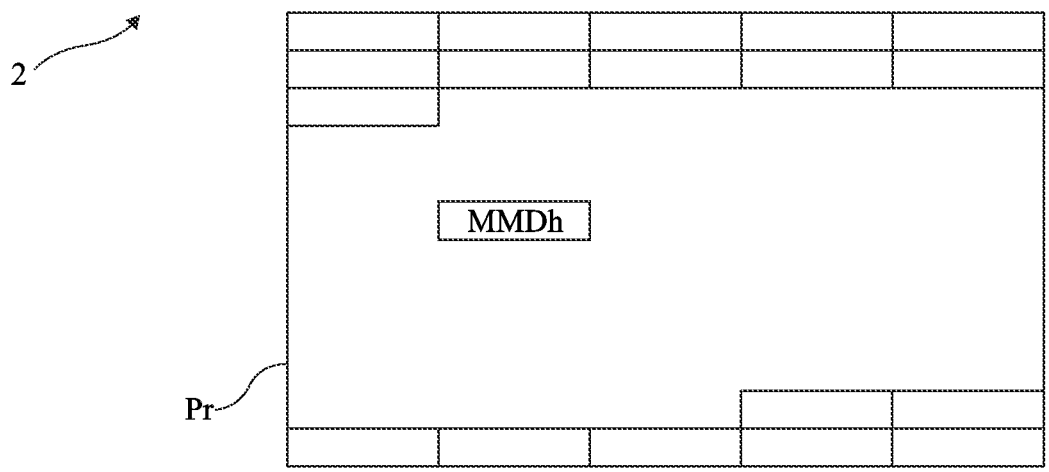

FIG. 3 illustrates an embodiment of a physical organization of data in a flash memory.

The transition between the logic organization (FIG. 2) and the physical organization of the data storage is transparent for processing unit 11 and the other circuits accessing the memory. The unit for managing memory 2 converts virtual addresses provided by the different entities into physical addresses. Further, to manage the atomicity, the management unit generates metadata which are also stored in memory 2.

To comply with the erasing constraint, the memory is physically organized in pages P, representing the erasing granularity. The memory is thus divided into r pages P having identical sizes. Each page comprises a same number of words, forming the write (and read) granularity. The pages are preferably divided in two categories.

A first category comprises pages Pl divided into n frames Fj, each comprising a plurality of data words (assembly DBj) and a number of frame metadata words FMDj (from one to a few, for example, two). For example, all frames comprise a same number of data words and the same number of frame metadata words. Each page Pl further comprises a number m (from a few to a few tens) of page metadata words PMDl(k) independent from the frames. The number of data words of each frame preferably corresponds to an integral multiple (at least 1) of the number of data words of each block DB of the virtual organization of the memory. Thus, a frame Fj contains a data block DBj and frame metadata FMDj. In FIG. 3, block DBj followed by metadata FMDj has been illustrated for each frame. However, preferably and as will be seen hereafter, part of the metadata are written at the beginning of each frame Fj.

A second category of pages, by a much smaller number than the number of pages Pl of the first category, only contains memory metadata words MMDh.

Preferably, the second category comprises a single page Pr and the first category thus comprises r-l pages Pl.

As a variation, only pages of the first category are provided in one embodiment.

According to a specific embodiment, a page contains 1,024 bytes. The r-l pages Pl of the first category each contain 25 frames of 10 words each and 6 page metadata words PMDl are provided. Each frame Fj contains a block DBj, of eight data words W, and two frame metadata words FMDj. According to this specific embodiment, each frame can thus contain two logic blocks Bi. Further, a single page Pr of memory metadata words MMDh is provided.

This is a specific example and other granularities may be provided, provided for all words to have the same size, representing the write granularity in the memory. In particular, logic blocks Bi of variable size (number of words), which are then capable of being distributed in a plurality of blocks DBj in a plurality of frames, may be provided.

Frame metadata FMDj contain at least one word FCONST (preferably a single word FMDj(1)) of fixed value, identical whatever the value of the data contained in block DBj and at least one word (preferably a single word FMDj (2)) containing the number(s) (identifier(s) i) of the virtual block(s) Bi written into real block DBj. Word FMDj(2) also contains a state indicator FW (end of writing) of block DBj and a CRC-type error-control code. The frame metadata are used for the frame atomicity, that is, they indicate whether the block DBj contained in the frame is stable or not.

Figure 4:
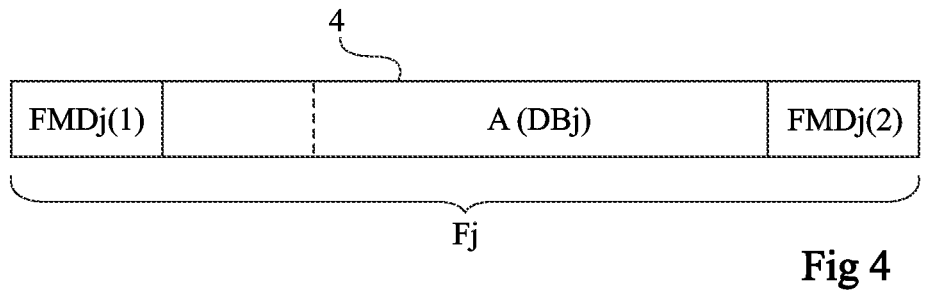
FIG. 4 schematically illustrates an embodiment of a frame structure of the memory of FIG. 3.

FIG. 4 schematically illustrates an embodiment of a structure 4 of frame Fj, assuming two metadata words FMDj.

According to this embodiment, metadata word FMDj(1) of fixed value FCONST is written first, followed by the words of data A, and finally by metadata word FMDj(2). The CRC code contained in word FMDj(2) is preferably a CRC of word FMDj(1) and of block DBj. Due to the use of a fixed value for word FMDj(1), it will be possible to ascertain that there has been no untimely pulling out or attack at the beginning of the writing of the frame, for example, an attempt to modify the content of block DBj during an attack. The value is fixed, that is, it is the same for a given frame, but may vary from one frame to another. Preferably, for simplification, the value is the same for all memory frames.

According to the first aspect, page metadata PMDl contain a word PMDl(1) indicating that the page has started being written into and that it is no longer blank, preferably but optionally a word PMDl(2) indicating that the page is full, a word PMDl(3) indicating that the next page is erased (thus blank), a word PMDl(4) indicating the fact that the page is obsolete, that is, that none of the frames contains a block that can still be useful (in other words, that all the blocks of this page have already been previously modified in other pages), and a word PMDl(5) containing an order number of the page, that is, the value of a counter PWN of the number of written pages at the time that the page is written to. The page metadata according to this first aspect are used to indicate the switching from one page to another and to allow an atomicity recovery at the starting or at the resetting of the circuit. The words are not necessarily physically in this order in the page.

According to the second aspect of the description, the page metadata further contain, in addition to or instead of word PMDl(3) indicating that the page has been erased, a word PMD(6) indicating the number of erase operations applied to the page.

The only link between the logic sizes and the physical organization of the memory is that all words have the same size. It should be reminded that, when a word is blank (erased), all its bits are in a first state (designated as high or 1). The programming of a word to store a value therein comprises selecting the bits of the bytes of the word which should switch state and be written (switch to the low state or 0). The programming of a flag or indicator comprises programming the bit(s) of the byte to the state corresponding to the low state. It should be reminded that once it has been written or programmed to state 0, the content of the word cannot be modified, unless the entire page is erased and reprogrammed.

The writing of the data into the memory is performed block by block as they are being received, and successively into each page. Thus, in case of successive writings of a same logic block (for example, the value of a counter), this same data block Bi may end up being written a plurality of times into the memory with different values along the write operations. This takes part in the resolution of the atomicity problem since, from the time when a piece of data A will have been written once with a first value, one may always, in subsequent write operations, return to the previous value representing the stable state in case of a writing problem for the current value.

However, on the side of logic memory 2V, a same piece of data A is always "stored" in the same block Bi (or the same blocks). Thus, identifier i (the address) of block Bi in the logic memory enables to find the physical block(s) DBj of memory 2 containing data A (containing the successive values of data A).

For simplification, the operation is discussed hereafter by arbitrarily assuming that the considered data A occupy one and the same block Bi and that blocks DBj have the size of a block Bi. However, all that is described more generally applies to the practical case where data A may occupy a plurality of blocks or a block portion and to different sizes of blocks Bi and DBj.

Figure 5:
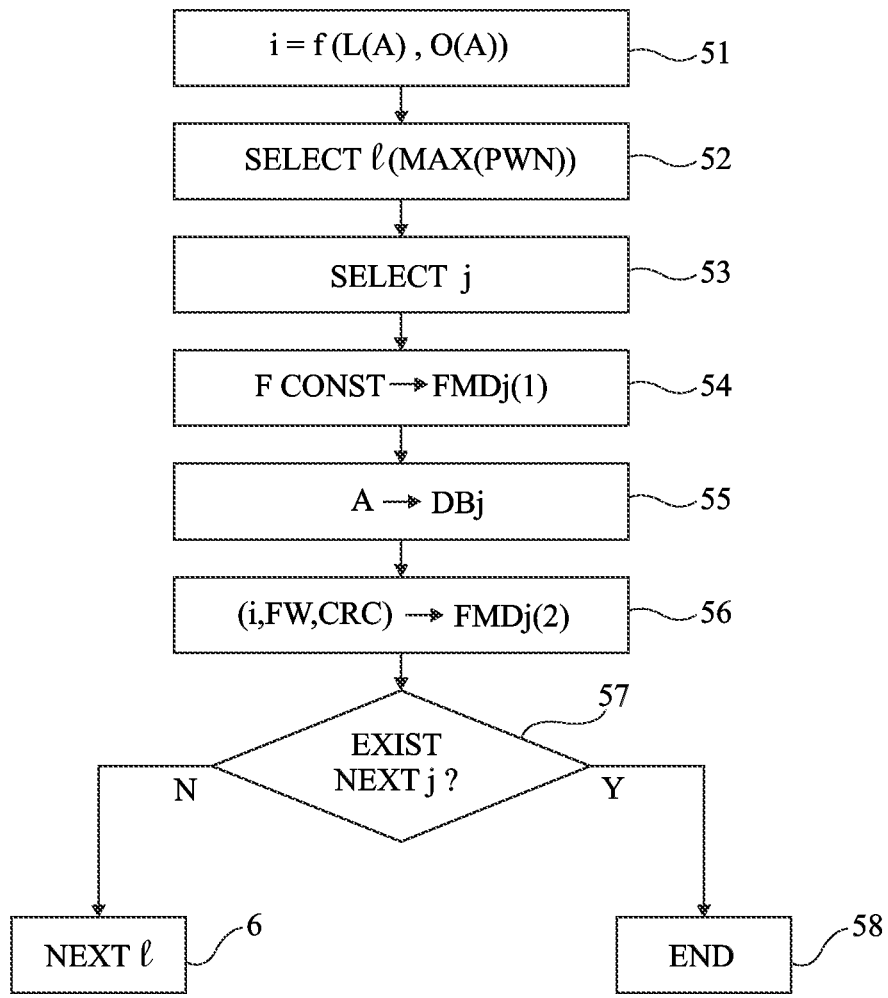
FIG. 5 is a block diagram illustrating an embodiment of a writing of data into the memory.

FIG. 5 is a block diagram illustrating an embodiment of the writing of data A into memory 2.

Based on length L(A) and on offset O(A) of data A in virtual array 2V (FIG. 2), the memory management circuit determines (block 51, i=f(L(A), O(A))) the identifier i of block DBi containing the data.

Then (block 52, SELECT l(MAX(PWN))), the page Pl having the largest count value of the counter of the number of written pages PWN is selected by scanning (by reading) the corresponding words PMDl(5) of the page metadata.

Then (block 53, SELECT j), the first frame Fj sequentially available in page Pl is identified. The selection is for example performed by successively scanning the frames until reaching the first one having an unprogrammed metadata word FMDj(1) intended for fixed value FCONST. As a variation, second metadata word FMDj(2) is read and the first frame having its end-of-writing FMDj indicator FW at state 1 or having an unprogrammed block identifier i is selected. It is assumed in this example that a new page is opened at the end of the writing of the last frame of a page. Accordingly, an available frame is found at step 53.

As a variation, if no frame is free, this means that the page is full. A new page opening subroutine is then executed. This subroutine will be discussed hereafter in relation with FIG. 6.

Once frame Fj has been selected, it is started by writing (block 54, FCONST→FMDj(1)), into frame Fj, first fixed metadata word FMDj(1) (it is actually the first logically-written word). Physically, the words may be in a different order in the frame). Then (block 55, A→DBj), piece of data A is written into block DBj, after which (block 56, (i, FW, CRC)→FMDj(2)) second metadata word FMDj(2) is written with identifier i, end-of-writing indicator FW, and the CRC of the first words (FMDj(1) and DBj) of the frame.

It is then checked whether the page is full, that is, whether there exists a frame Fj available for the next write operation (block 57, EXIST NEXT j?). If there is (output Y of block 57), the writing ends (block 58, END). In the case where data A may represent a plurality of blocks DBi, it is returned to step 53 to write into the next frame. In a more general case where the frames have a variable size and where the space available at the end of the page is not sufficient to store the next frame, either a free space is left, or the frame is cut in two and a portion is stored in the current page and a portion is stored in the next page.

If not (output N of block 57), that is, if there is no further available frame, a next page is prepared for the next write operation (block 6, NEXT l). For simplification, the case where the next page is prepared is considered (index l incremented by one) but it may more generally be provided to link a plurality of pages together in order to accelerate the speed of the writing of a plurality of blocks with no intermediate erasing. In this case, it is provided to skip one or a plurality of pages when a page is full.

Figure 6:
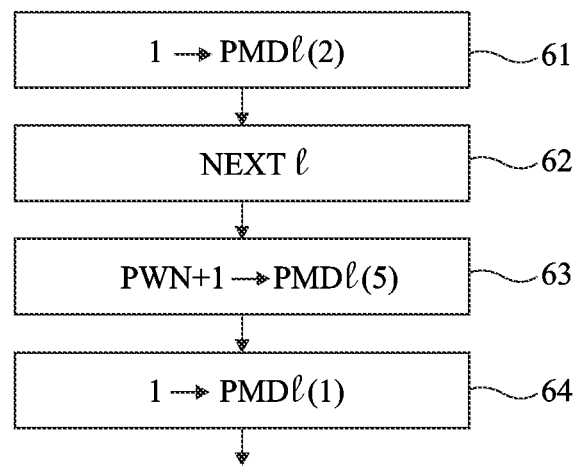
FIG. 6 is a block diagram illustrating an embodiment of a preparation of a next page for a write operation when a current page is full.

FIG. 6 is a block diagram illustrating an embodiment of a preparation of a next page for a write operation when a current page is full.

It is started (block 61, 1→PMDl(2)) by closing the current page, that is, by programming its end-of-page or full page metadata word PMDl(2). Then (block 62, SELECT NEXT l), the next page Pl available, that is, obsolete, is selected. The value of the number of written pages, incremented by 1, is then programmed (block 63, PWN+1→PMDl(5)) in the corresponding page metadata word PMDl(5) and the page opening indicator is also programmed (block 64, 1→PMDl(1)).

With such a write process in memory 2, one can, in read mode, find the last atomic transaction for each data.

It will be appreciated that the count value PWN of the number of written pages effectively is simply a sequential number assigned to each page at the time, or shortly before, data is being written to the page. Thus, the first page Pl being written to is either pre-assigned a count value PWN of 1 or is assigned that count value when data is desired to be written to the first page. The second page Pl being written to is assigned a count value PWN of 2, either when the first page is determined to be full or when new data is desired to be written into the second page. That process continues for each of the subsequent pages being written to.

Figure 7:
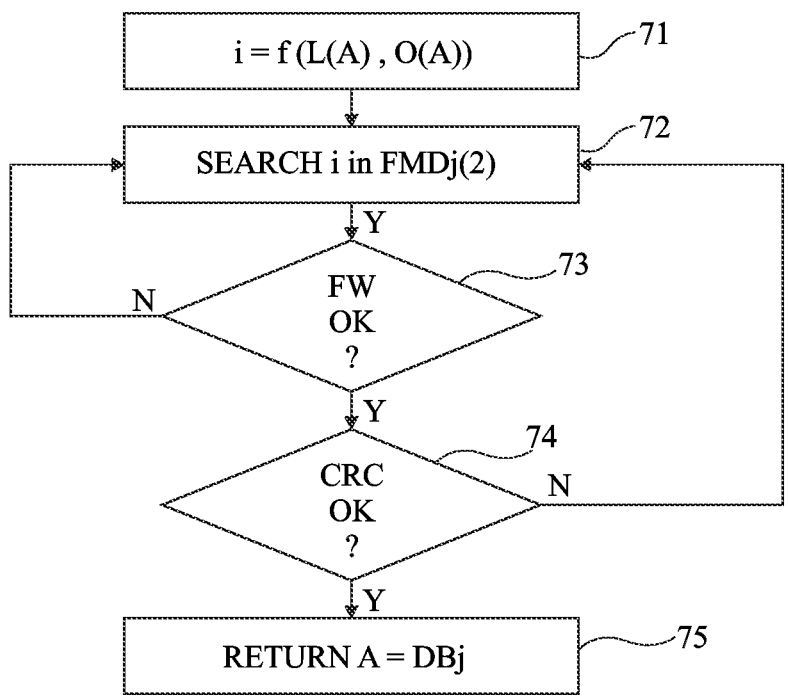
FIG. 7 is a block diagram illustrating an embodiment of a reading of data from the memory.

FIG. 7 illustrates in the form of block diagrams an embodiment of a reading of data A from memory 2.

Based on length L(A) and on offset O(A) of data A in virtual array 2V, the memory management circuit determines (block 71, i=f(L(A), O(A))) the identifier i of the block Bi containing the data. The memory reading is performed by scanning frames Fj from the last written frame of the last written page by searching the block DBj where block Bi is located, by its identifier i. In practice, a scanning is performed (block 72, SEARCH i in FMDj(2)), into memory 2 from the page having the largest count value of the number of written pages PWN in its metadata word PMDl(5) and, page by page, from the last written frame in the page. It is here stopped at the first occurrence of identifier i in a second frame metadata word FMDj(2).

Once the frame has been found, the state indicator FW which indicates whether the frame writing has ended with no untimely pulling out indicating, in principle, whether the data are stable or not, is then verified (block 73, FW OK?).

If the state indicator is not valid (output N of block 73), the frames are then scanned back (block 72) all the way to that containing the previous version of data block DBj.

If the state indicator is valid (output Y of block 73), the error code is verified (block 74, CRC OK?) by recalculating a CRC on the data present in the first metadata word FMDj(1) and in the data block (DB(j)).

If the calculated code is identical to the stored code (output Y of block 74), data block DBj is valid and the reading supplies (block 75, RETURN A=DBj) the value of block DBj as being data A, and thus as the content of virtual block Bi.

If the CRC code is not confirmed (output N of block 74), this means that the data are not reliable. The memory is then scanned back (block 72) to find the previous writing of the data, which amounts to searching for the last atomic transaction.

As a variation, when a frame having an erroneous CRC is identified (output N of block 74), it is started by writing into the second metadata word FMDj(2) an indicator that the frame is polluted. This saves some time at the next reading of data A since it avoids recalculating the CRC before going back to the previous occurrence.

Figure 8:
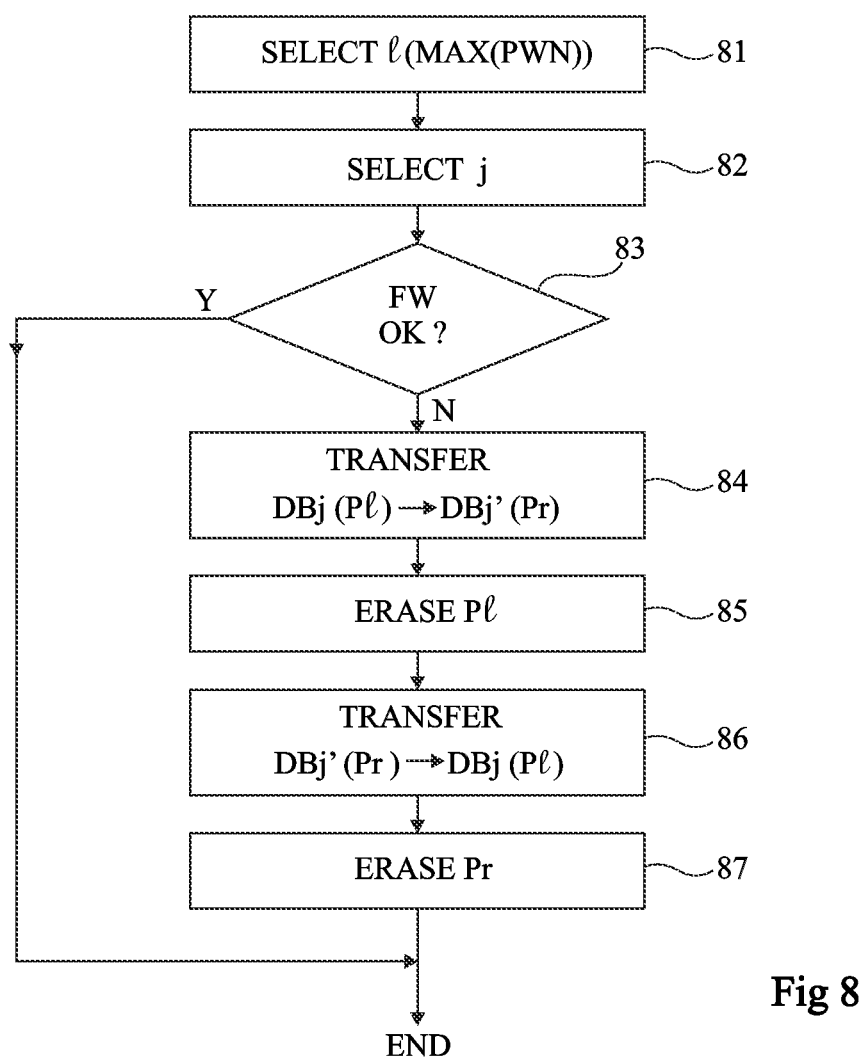
FIG. 8 is a block diagram illustrating an embodiment of an atomicity recovery at the level of a page.

FIG. 8 is a block diagram illustrating an embodiment of an atomicity recovery at the level of a page.

In practice, this process is carried out at the starting or on resetting of the circuit, which amounts to verifying the atomicity after each incidental or intentional untimely pulling out or powering off.

It is started by selecting (block 81, SELECT l(MAX(PWN))) the page having the maximum value of the counter of the number of written pages. Then, the last frame written in this page is selected (block 82, SELECT j). The second metadata word FMDj(2) is then read and it is verified (block 83, FW OK?) whether write indicator FW is correct (is programmed). If it is (output Y of block 83), there is no atomicity issue and the powering off or resetting has occurred while the write processes into the flash memory had ended. It is then proceeded to the normal operation, that is, the atomicity verification process has ended (END). As a variation, to make sure that there has been no untimely pulling out at the end of the writing and to guarantee the stability of word FMDj(2), the same value is reprogrammed in word FMDj(2).

If not (output N of block 83), this means that an untimely pulling out (power cut-off or resetting) has occurred during a writing into the flash memory. According to a preferred embodiment, page Pr is then used to transfer (block 84, TRANSFER DBj(Pl)→DBj'(Pr)) all the valid frames of page Pl to page Pr. Then, page Pl is erased (block 85, ERASE Pl). The different steps of the copying, to page Pr, and then of the recopying from page Pr, are validated by metadata words in page Pr to make sure that, in case of an untimely pulling out during the recovery procedure, the started procedure is effectively continued and that it is not started over at the beginning of the untimely pulling out procedure at the risk of definitively losing the data still valid in page Pl.

According to an embodiment, page Pr is a dedicated memory page. An inverse transfer (block 86, TRANSFER DBj'(Pr)→DBj(P1)) of the data temporarily stored in page Pr to the erased page Pl is then carried out. The page metadata are then also rewritten. Finally, page Pr (block 87, ERASE Pr) so that it is ready for a next use.

According to another embodiment, page Pr is any available page. In this case, it is not necessary to transfer the data to page Pl after erasing.

Preferably, the processing of FIG. 8 also comprises a step of verifying the atomicity of the page metadata. To achieve this, at a restarting and on the last written page, an error-correction code stored in one of the page metadata words PMDl(k) is verified.

Preferably, before step 84, the metadata words PMDl(2) of all the pages which have been written after the frame Fj selected at block 82 are written as indicating a full page. Thus, these pages cannot be used without being erased.

According to the variation where only pages of the first category are used, the copying of the reliable frames into a new page after the detection of an erroneous frame can be avoided. Indeed, the critical frame will anyway not be considered in read mode and the previous reliable data will be read. However, this decreases the capacity of the memory in terms of number of untimely pulling outs that it can withstand since lost frames are kept.

The number of available (erased) pages is at least two to enable to erase a page. When there is no further available page (other than the two minimum pages), one of the written pages is selected, preferably the page where the number of written frames is minimum. This page to be erased is then scanned by verifying its frames and those which contain the last reliable states of blocks Bi. All these blocks are transferred (written) as described in relation with FIG. 4 towards one of the available pages. Thus, at most n blocks are transferred (in practice, there are at least certain frames containing obsolete data so that this transfer results in available frames in this page). Once the transfer is over, the original page is erased. Once the erasing has been performed, the erased page indicator is programmed (PMDl(4)).

As a variation, a minimum number of pages, greater, for example, than three or four, is set to have more available frames in order to store a larger number of transactions without requiring an erase operation.

According to the second aspect of the present description, each time flash memory 2 is deleted, a counter of the number of erase operations on the concerned page is incremented.

Figure 9:
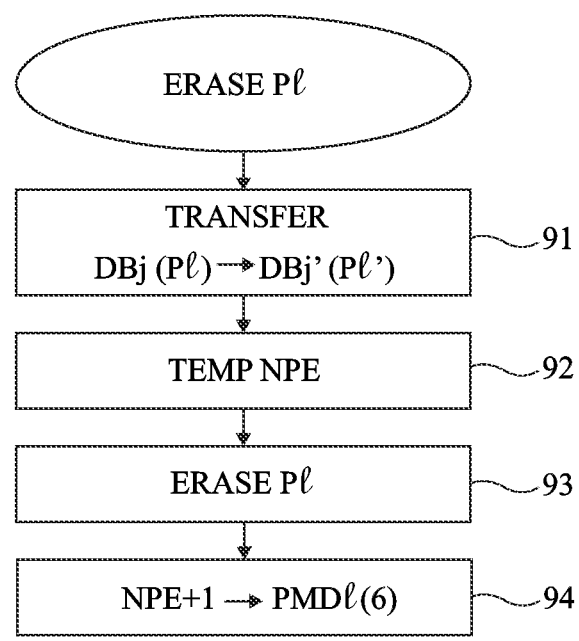
FIG. 9 is a block diagram illustrating an embodiment of a selection of a page to be erased according to the second aspect.

FIG. 9 is a block diagram illustrating an embodiment of a selection of a page to be erased according to the second aspect.

To erase a page Pl (ERASE Pl), it is started, as indicated hereabove, by transferring (block 91, TRANSFER DBj(Pl)→DBj'(Pl')) all the data blocks DBj of page Pl having its content representing the last stable value of a piece of data into a block DBj'(Pl') of one of the available memory pages. One stores (block 92, TEMP NPE) counter NPE of the number of page erase operations in a metadata word of the previous page, after which page Pl is erased (block 93, ERASE Pl). Once the erasing has been performed, metadata word PMDl(6) is programmed (block 94, NPE+1→PMDl(6)) to the value of the number of erase operations incremented by one.

According to this embodiment, the selection of the page to be erased does not necessarily correspond to the page having the minimum value of number of written pages but to that having the minimum count value of the number of written pages from among the pages having been submitted to a lesser number of erase operations.

The application of this embodiment enables to optimize the lifetime of the flash memory by optimizing the homogeneity of the number of erase operations among the number of pages. Indeed, if there had been no atomicity recovery process, the page having the maximum count value of the number of written pages would be among those having been erased a smaller number of times. However, since the application of the atomicity recovery process at the level of a page results in a transfer, with the same count value of the number of written pages, to an available page, this does not necessarily correspond, particularly in case of a large number of implementations of the atomicity recovery.

It should be noted that, if this second aspect can be combined with the first one, it can also be more generally implemented in any flash memory management method.

Another advantage is that in case of an implementation of the atomicity recovery process at the level of a page such as described in relation with FIG. 9, there is a risk for the error to be at the level of the number of written pages, in which case this page risks, without the implementation of the counter of the number of erase operations, never being erased.

An advantage of the embodiments which have been described is that they improve the management of a flash memory for the processing of operations having to respect an atomicity criterion.

Another advantage is that they easily enable to trace back the last atomic value of a piece of data.

Various embodiments have been described. Various alterations, modifications, and improvements will readily occur to those skilled in the art. Further, the practical implementation of the described embodiments is within the abilities of those skilled in the art based on the functional indications given hereabove and by using circuits usual per se. Particularly, the organization of the memory addressing and the generation of the signals adapted to the control of said memory and to this addressing use techniques usual per se.

Such alterations, modifications, and improvements are intended to be part of this disclosure, and are intended to be within the spirit and the scope of the present invention. Accordingly, the foregoing description is by way of example only and is not intended to be limiting. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method, comprising
managing a flash memory, the managing including:
dividing the flash memory into pages defining an erase granularity of the flash memory, each page comprises at least one first page metadata word configured to contain, when the page is written to, a count value of a counter of a number of pages that have been written to;
dividing each page into frames, each frame being configured to contain at least one data block and at least two frame metadata words including a first frame metadata word configured to store a block identifier;
opening a current page of the flash memory by incrementing the count value of the counter and writing the incremented count value into the at least one first page metadata word;
selecting the current page to be written to as being the page having its at least one first page metadata word containing a highest count value of the counter of the number of written pages; and
writing a logic data block into a selected one of the frames of the current page of the memory and accompanying the writing of the logic data block by writing a block identifier of the logic data block into the first frame metadata word of the selected one of the frames of the current page.

2. The method of claim 1, wherein the frames are written sequentially into each page.

3. The method of claim 1, wherein the first frame metadata word also contains a value representative of an error-control code calculated at least from data of the selected one of the frames of the current page.

4. The method of claim 3, wherein the managing includes writing into a second frame metadata word of the selected one of the frames of the current page a value which is independent from data being written into the selected one of the frames of the current page and which is always the same for the selected one of the frames of the current page.

5. The method of claim 4, wherein said second frame metadata word has a fixed value for all the frames of the flash memory.

6. The method of claim 1, wherein said at least one first page metadata word is written before any frame is written into the page.

7. The method of claim 1, comprising reading of a logic data block from the flash memory, the reading including:
searching for a last written frame having its first frame metadata word store a block identifier corresponding to a block identifier of the logic data block being read; and
verifying whether writing of data into the last written frame respects an error-control code and, if not, searching for a previous written frame having its first frame metadata word store a block identifier corresponding to that of the logic data block being read.

8. The method of claim 1, wherein the managing includes performing, on each starting of a memory management circuit that performs the managing, a verification of an atomicity of a last written frame.

9. The method of claim 8, wherein, in response to the verification indicating the last written frame is invalid, all the valid frames of the current page are transferred into an available page and the current page is erased.

10. The method of claim 9, wherein said available page is a dedicated page.

11. A flash memory management circuit that, in operation, performs a method comprising:
managing a flash memory, the managing including:
dividing the flash memory into pages defining an erase granularity of the flash memory, each page comprises at least one first page metadata word configured to contain, when the page is written to, a count value of a counter of a number of pages that have been written to;
dividing each page into frames, each frame being configured to contain at least one data block and at least two frame metadata words including a first frame metadata word configured to store a block identifier;
opening a current page of the flash memory by incrementing the count value of the counter and writing the incremented count value into the at least one first page metadata word;
selecting the current page to be written to as being the page having its at least one first page metadata word containing a highest count value of the counter of the number of written pages; and
writing a logic data block into a selected one of the frames of the current page of the flash memory and accompanying the writing of the logic data block by writing a block identifier of the logic data block into the first frame metadata word of the selected one of the frames of the current page.

12. The flash memory management circuit of claim 11, wherein the managing includes storing in the first frame metadata word a value representative of an error-control code calculated at least from data of the selected one of the frames of the current page.

13. The flash memory management circuit of claim 12, wherein the managing includes writing into a second frame metadata word of the selected one of the frames of the current page a value which is independent from data being written into the selected one of the frames of the current page and which is always the same for the selected one of the frames of the current page.

14. The flash memory management circuit of claim 11, wherein the managing includes reading of a logic data block from the flash memory, the reading including:
  searching for a last written frame having its first frame metadata word store a block identifier corresponding to a block identifier of the logic data block being read; and
  verifying whether writing of data into the last written frame respects an error-control code and, if not, searching for a previous written frame having its first frame metadata word store a block identifier corresponding to that of the logic data block being read.

15. The flash memory management circuit of claim 11, wherein the managing includes performing, on each starting of the flash memory management circuit that performs the managing, a verification of an atomicity of a last written frame, wherein, in response to the verification indicating the last written frame is invalid, all the valid frames of the current page are transferred into an available page and the current page is erased.

16. An electronic circuit comprising:
  a flash memory;
  flash memory management circuitry, which, in operation:
    divides the flash memory into pages defining an erase granularity of the flash memory, each page having at least one first page metadata word configured to contain, when the page is written to, a count value of a number of pages that have been written to;
    divides each page into frames, each frame being configured to contain at least one data block and at least two frame metadata words including a first frame metadata word configured to store a block identifier;
    opens a current page of the flash memory by incrementing the count value of the counter and writing the incremented count value into the at least one first page metadata word;
    selects the current page to be written to as being the page having its at least one first page metadata word containing a highest count value of the counter of the number of written pages; and
    writes a logic data block into a selected one of the frames of the current page of the flash memory and accompanying the writing of the logic data block by writing a block identifier of the logic data block into the first frame metadata word of the selected one of the frames of the current page.

17. The electronic circuit of claim 16, wherein the managing includes storing in the first frame metadata word a value representative of an error-control code calculated at least from data of the selected one of the frames of the current page.

18. The electronic circuit of claim 17, wherein the managing includes writing into a second frame metadata word of the selected frame with a value which is independent from data being written into the selected frame and which is always the same for the selected frame.

19. The electronic circuit of claim 16, wherein the managing includes reading of a logic data block from the flash memory, the reading including:
  searching for a last written frame having its first frame metadata word store a block identifier corresponding to a block identifier of the logic data block being read; and
  verifying whether writing of data into the last written frame respects an error-control code and, if not, searching for a previous written frame having its first frame metadata word store a block identifier corresponding to that of the logic data block being read.

20. The electronic circuit of claim 16, wherein the managing includes performing, on each starting of the flash memory management circuit circuitry that performs the managing, a verification of an atomicity of a last written frame, wherein, in response to the verification indicating the last written frame is invalid, all the valid frames of the current page are transferred into an available page and the current page is erased.

21. The electronic circuit of claim 16 wherein the flash memory management circuitry, in operation, responds to a start-up of the flash memory by determining whether data written into a last written frame is stable.

* * * * *

UNITED STATES PATENT AND TRADEMARK OFFICE
CERTIFICATE OF CORRECTION

PATENT NO. : 10,162,540 B2
APPLICATION NO. : 15/380509
DATED : December 25, 2018
INVENTOR(S) : Michel Dawirs et al.

Page 1 of 1

It is certified that error appears in the above-identified patent and that said Letters Patent is hereby corrected as shown below:

In the Claims

Column 14, Line 38:
"memory management circuit circuitry that performs the"
Should read:
--memory management circuitry that performs the--.

Signed and Sealed this
Twenty-seventh Day of August, 2019

Andrei Iancu
*Director of the United States Patent and Trademark Office*